United States Patent Office 3,809,725
Patented May 7, 1974

3,809,725
REACTION PRODUCT OF 2-VINYL-5-NORBOR-
NENE WITH HEXAHALOCYCLOPENTADIENES
Richard Waldron Davenport, Lincoln Park, N.J., assignor
to Uniroyal, Inc., New York, N.Y.
No Drawing. Filed Apr. 17, 1972, Ser. No. 244,951
Int. Cl. C07c 23/20, 17/30
U.S. Cl. 260—648 C                6 Claims

ABSTRACT OF THE DISCLOSURE

The invention is new halodimethanonaphthalenes, namely 6-(1',4',5',6',7',7' - hexahalonorborn-5'-en-2'-yl)-1,2,3,4,10,10 - hexahalo - 1,4,4a,5,6,7,8,8a - octahydro-1,4:5,8 - dimethanonaphthalenes, especially 6 - (1',4',5', 6',7',7' - hexachloronorborn - 5' - en-2'-yl)-1,2,3,4,10,10-hexachloro - 1,4,4a,5,6,7,8,8a - octahydro - 1,4:5,8 - dimethanonaphthalene (hereinafter "ZOR"), a method of synthesizing same by the reaction of 5-vinyl-2-norbornene with hexahalocyclopentadiene, and use of such chemicals for flameproofing organic polymeric materials, especially ABS resins to which the chemicals impart fire resistance with unexpected retention of desirable physical properties.

BACKGROUND OF THE DISCLOSURE

1. Field of the invention

The field of the invention is new halodimethanonaphthalenes having the valuable property of imparting flame resistance to organic polymeric materials, especially ABS resins to which they impart fire resistance with unexpected retention of their desirable physical characteristics, a method of synthesizing such chemical compounds, and use thereof for imparting flame resistance to such polymeric materials.

2. Description of the prior art

The most pertinent prior art known consists of the following U.S. Pats: Reissue 25,430; 3,403,036; 3,442,977; and 3,442,980, and British Pat. 1,220,524. U.S. Reissue 25,430 discloses the chemical compound 1,2,3,4,9,9 - hexachloro - 1,4,4a,5,6,7,8,8a - octahydro - 1,4 - methanonaphthalene - 6,7 - dicarboxylic anhydride which is sold under the trademark "Cloran," while U.S. 3,442,980 discloses the incorporation of this compound with acrylonitrile-butadiene-styrene (ABS) graft polymers to give flame-retardant compositions. U.S. 3,442,977 shows use of the same compound in conjunction with chlorinated polyethylene as a flameproofing adjunct for ABS graft polymers.

U.S. 3,403,036 describes a flame retardant for polymeric compositions, having the general formula:

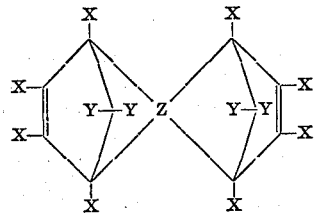

where X is selected from the group consisting of bromine, chlorine and fluorine, Y is selected from the group consisting of bromine, chlorine, fluorine, alkyl and alkoxy; and Z is a tetravalent cyclic hydrocarbon radical containing at least five carbon atoms. In each case specified in this patent each reactant forming the Z radical is characterized by being a cyclic hydrocarbon having two centers of unsaturation. In contrast, the reactant (5-vinyl-2-norbornene) reacted with hexahalocyclopentadiene to form the flameproofing compounds of the present invention has only one center of unsaturation in a cyclic system to which is attached a divalent linear part. The chemical compounds of the present invention are very different from any thing taught or suggested by this patent.

British Pat. 1,220,524 describes a flame retardant for polymeric compositions having the general formula:

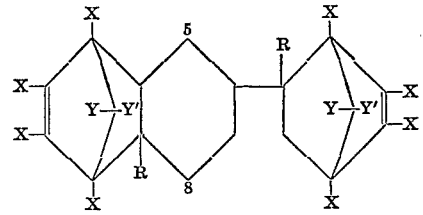

where X represents a halogen atom; Y and Y' represent a halogen atom, an alkyl or alkoxy radical containing 1 to 4 carbon atoms; and each of the R radicals, which may be the same or different, represents a hydrogen or halogen atom or an alkyl radical containing 1 to 4 carbon atoms. The preferred structure is given when X, Y, and Y' are chlorine and R is hydrogen; for brevity a compound having this preferred structure is referred to hereinafter as "CNB" (not a trademark), this being the designation under which it is sold. The structure of the compounds of the present invention differ in that they have a 5,8-methano group and are therefore 1,4:5,8-dimethanonaphthalenes. The superior flame retarding effectiveness of ZOR, a preferred compound of the present invention, compared to "CNB" is shown in Examples 8 and 11 below.

SUMMARY OF THE INVENTION

This invention relates to compounds, namely 6-(1',4',5', 6',7',7' - hexahalonorborn - 5' - en-2'-yl)-1,2,3,4,10,10-hexahalo - 1,4,4a,5,6,7,8,8a - octahydro - 1,4:5,8 - dimethanonaphthalenes which have useful properties, particularly as flame retardants for organic polymeric materials, especially ABS resins.

The compounds of the present invention have the formula:

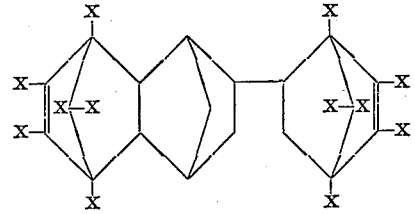

where X is halogen, preferably chlorine. Where each of the X's is chlorine the compound is identified herein as "ZOR," this being a code name used internally by the assignee of this invention; it is not a trademark at the present time.

The present invention also provides a method of preparing the above-identified compounds by heating at 110° C. to 220° C. for 2 to 100 hours two or more moles of the hexahalocyclopentadiene and one mole of 5-vinyl-2-norbornene. Suitable solvents include xylene, dichlorobenzene, and trichlorobenzene although the reaction may be run in the absence of a solvent. ZOR prepared in this manner is a mixture of isomers which may be separated by fractional crystallization. The variations in melting point of the several mixture forms of ZOR obtained in preparative Examples 1 through 5 below are attributable to variations in percentages of the isomers in such mixtures.

The fire retardant additives of this invention may be blended with the ABS resin or other polymeric material by conventional techniques such as milling and compression molding or by injection molding techniques. They may be incorporated into the ABS resin or other polymeric material in the amount of from 5 to 35 p.p.h.; preferably from 15 to 30 p.p.h. Improved fire retardance can be provided by incorporating antimony oxide into the fire retardant composition. The amount of antimony oxide employed can vary widely but typically ranges from 3 to 15 p.p.h. The fire retardant ABS compositions made in accordance with the present invention unexpectedly retain the desirable physical properties, particularly impact resistance, hardness, and heat distortion temperature, and the good processing characteristics of the ABS resins.

The expression "p.p.h." as used herein means parts by weight of additive per 100 parts of thermoplastic polymeric material.

ABS resins are the preferred polymeric materials rendered flame retardant by the present invention. The expression "ABS resin" is used herein in its ordinary and accepted meaning to designate a thermoplastic resinous acrylonitrile-butadiene-styrene polymeric material, usually made by "grafting" acrylonitrile and styrene monomers onto a rubbery polybutadiene or rubbery butadiene-styrene copolymer "spine" either by an emulsion polymerization technique or by so-called solution polymerization. Frequently separately prepared styrene-acrylonitrile resinous copolymer is admixed with the product of the grafting step. See U.S. Pats. 2,820,773; 3,238,275 and 3,624,183 for typical ABS graft copolymer prepartions. Less commonly, ABS resins are made by blending a butadiene-acrylonitrile rubbery copolymer with a styrene-acrylonitrile resinous copolymer.

Less advantageously, organic polymeric materials other than ABS resins can be rendered flame retardant in accordance with the present invention. Examples of such other materials are polyolefins such as polyethylene and polypropylene, thermoplastic or thermosetting polyurethanes, polystyrene, thermosetting polyester resins comprising a polyester resin and a copolymerizable monomer such as styrene, etc.

The invention can also be applied to gum plastics other than ABS resin such as those made by grafting suitable monomers, such as styrene and acrylonitrile, onto a spine rubber which is a rubbery copolymer of ethylene and propylene (often called "EP rubber") or a rubbery terpolymer (generally referred to as an "EPDM rubber") of ethylene, propylene and at least one copolymerizable diene such as 1,4-hexadiene, dicyclopentadiene, cyclooctadiene, methylene norbornene, ethylidene norbornene, isopropylidene norbornene or mixtures thereof.

DESCRIPTION OF THE PREFERRED EMBODIMENTS

Preparation of ZOR

EXAMPLE 1

Preparation of 6-(1',4',5',6',7',7' - hexachloronorborn-5'-en-2'-yl) - 1,2,3,4,10,10 - hexachloro - 1,4,4a,5,6,7,8,8a-octahydro-1,4:5,8-dimethanonaphthalene ZOR as made is a mixture of isomers of M.P. 289–90° and 263–4° and is prepared by causing 5-vinyl - 2 - norbornene to react with 2 or more moles of hexachlorocyclopentadiene.

5-vinyl-2-norbornene (30.0 g., 0.25 mole), hexachlorocyclopentadiene (156 g., 0.571 mole, 14.2% excess), and 3,5-di-t-butylcatechol (0.2 g.) were heated and stirred under nitrogen at 180–193° C. for 6 hours. Heating was then discontinued and methanol (300 ml.) was cautiously added through the reflux condenser with vigorous stirring. After stirring for 1 hour, the solid (93%) separated by filtration was washed with methanol (100 ml.). The crude product was purified further by heating and stirred with methanol (400 ml.) for 1 hour. The hot mixture was filtered to afford ZOR (146 g., 88%, M.P. 202–243° C.). Two isomers, M.P. 289–90° C. and 263–4° C., were separated by fractional crystallization from a solvent consisting of a mixture of chloroform and petroleum ether.

EXAMPLE 2

The experiment of Example 1 was repeated with the exception that the 3,5-di-t-butylcatechol was omitted. The yield of ZOR was 85%, M.P. 196–222° C.

EXAMPLE 3

The experiment of Example 1 was repeated with the exception that the mixture was heated at 130° C. for 1¾ hours and then at 180° C. for 16 hours. The yield of ZOR was 88%, M.P. 195–232° C.

EXAMPLE 4

A mixture of 5-vinyl-2-norbornene (200 g., 1.67 mole), hexachlorocyclopentadiene (950 g., 3.50 mole, 5% excess), 3,5-di-t-butylcatechol (1.0 g.) and xylene (1000 ml.) was heated at the reflux temperature for 4 days. The mixture was cooled in an ice bath and the resulting solid (873 g., 78.7%) was isolated by filtration. The crude product was purified further by stirring with petroleum ether (1000 ml.) for 1 hour and filtering to afford ZOR (657 g., 59.2%, M.P. 220–254° C.).

EXAMPLE 5

A mxture of 5-vinyl-2-norbornene (30.0 g., 0.25 mole), hexachlorocyclopentadiene (136 g., 0.50 mole) and o-dichlorobenzene (200 ml.) was heated to 108° C. overnight and then at the reflux temperature for 24 hours. The o-dichlorobenzene solvent was removed by distillation under reduced pressure and the residue was treated with 300 ml. of absolute ethanol. The mixture was filtered to afford ZOR (42 g., 26.8%, M.P. 145–160° C.). The filtrate deposited additional ZOR (36 g., 23.1%, M.P. 185–198° C.) upon standing. The total yield of ZOR was 78 g., 49.9%.

Use of ZOR as a flame retardant

The effectiveness of ZOR as a flame retardant has been established by comparing it with "Cloran" (trademark) which is widely regarded as one of the more effective fire retardants for ABS resins. A limited number of comparisons of ZOR with "CNB" have also been made. In the following examples ZOR will be compared to "Cloran" and "CNB" to establish that ZOR is a more effective flame retardant and unexpectedly retains the desirable physical properties of the ABS resin.

Fire retardant tests were of three different types: (1) ASTM D–635—a horizontal burning test, (2) ASTM D–2863—the oxygen index method, and (3) Underwriter's Laboratories Subject 94—a vertical burning test.

In Examples 6 through 8, 10 and 11, the ABS resin used was a graft copolymer product containing by weight 19% acrylonitrile, 24% butadiene and 57% styrene. In certain of the examples the legend "SE" means self-extinguishing and the legend "NB" means that the material tested did not burn.

EXAMPLE 6

Varying amounts of fire retardant additives were milled into an ABS resin and compression molded. Fire retardant tests were run by the ASTM D–635 and D–2863 methods.

TABLE I

| Code | Additive(s) | P.p.h. | ASTM D-635 burn rate (in./min.) | D-2863 oxygen index |
|---|---|---|---|---|
| A-0 | None | | 1.61 | 18.5 |
| A-1 | ZOR | 15 | 1.53 | 21.0 |
| A-2 | ZOR, Sb₂O₃ | 15.4 | 0.85 (2/5 SE) | 23.7 |
| A-3 | ZOR, Sb₂O₃ | 15.6 | NB | 25.4 |
| A-4 | ZOR, Sb₂O₃ | 20.6 | NB | 28.0 |
| A-5 | "Cloran", Sb₂O₃ | 15.4 | 1.71 | 22.1 |
| A-6 | do | 15.6 | 1.51 | 23.4 |
| A-7 | do | 20.6 | NB | 24.7 |

As shown in Table I, ZOR at the 20 p.p.h. level with 6 p.p.h. of antimony oxide gives an oxygen index of 28.0 vs. 24.7 for a comparable "Cloran"-containing composition. At the 15 p.p.h. level with 6 p.p.h. of antimony oxide ZOR has a significantly higher oxygen index (25.4 vs. 23.4) and superior D-635 performance (non-burning vs. burning at 1.51 in./min.) than a similar "Cloran"-containing composition. These results indicate that ZOR is superior to "Cloran" as a fire retardant for ABS resins.

EXAMPLE 7

The data of Table II was obtained from ABS resin samples which had been compression molded. In each case the total amount of ZOR and antimony oxide was kept constant at 20 p.p.h.

TABLE II

| Code | B-1 | B-2 | B-3 | B-4 | B-5 | B-6 | B-7 |
|---|---|---|---|---|---|---|---|
| ABS resin | 100 | 100 | 100 | 100 | 100 | 100 | 100 |
| $Sb_2O_3$ | 11.36 | 9.34 | 7.92 | 6.89 | 6.09 | 5.52 | 4.94 |
| ZOR | 8.64 | 10.66 | 12.08 | 13.11 | 13.91 | 14.48 | 15.06 |
| Cl/Sb ratio | 2:1 | 3:1 | 4:1 | 5:1 | 6:1 | 7:1 | 8:1 |
| D-2863 oxygen index | 24.0 | 25.6 | 26.2 | 25.6 | 25.6 | 24.8 | 25.1 |
| D-635 burn rate (in./min.) | 1.07 | 2 SE, 2 NB | 2 SE, 2 NB | 4 NB | 1 SE, 3 NB | 2 SE, 2 NB | 4 NB |
| Impact (notched izod, R.T. ⅛") | 2.72 | 3.16 | 2.98 | 3.09 | 3.50 | 3.36 | 2.93 |
| Rockwell hardness, R | 90 | 89 | 89 | 89 | 87 | 88 | 88 |
| Heat distortion temperature, °F | 189 | 185 | 185 | 181 | 185 | 180 | 185 |

As shown in Table II, the oxygen indices of the samples varied only within experimental error over a range of Cl/Sb ratio from 3/1 to 8/1. Similarly, D-635 test results showed no significant variation since the difference between SE and NB was very small in this particular case. Impact resistance reached a maximum of 3.50 ft. lbs./in. at a Cl/Sb ratio of 6/1. The ABS control (no additive) has an impact resistance of 4.30 ft.lb./in. Thus the effect of ZOR and antimony oxide upon physical properties is minimal. Heat distortion and Rockwell hardness varied little over the range studied. These results show that effective fire retardation can be achieved by varying the ratio of ZOR to antimony oxide over a wide range.

EXAMPLE 8

The test samples of Table III were prepared as in Example 6. The test method was the Underwriter's Laboratories Subject 94, a vertical burning test.

TABLE III

| Code | Additive | P.p.h. in ABS resin | UL-94 (V-1¹/₁₅") ¹ | Impact notched izod, R.T. ¹/₁₅" |
|---|---|---|---|---|
| C-1 | ZOR, $Sb_2O_3$ | 31.2, 11.1 | SE-0 | |
| C-2 | ZOR, $Sb_2O_3$ | 28.9, 10.9 | SE-0 | |
| C-3 | ZOR, $Sb_2O_3$ | 26.9, 10.7 | SE-0 | |
| C-4 | ZOR, $Sb_2O_3$ | 24.3, 10.7 | SE-0 | |
| C-5 | ZOR, $Sb_2O_3$ | 22.1, 10.3 | SE-0 | 1.55 |
| C-6 | ZOR, $Sb_2O_3$ | 20.9, 9.1 | B-ND | |
| C-7 | "Cloran", $Sb_2O_3$ | 30.0, 11.0 | SE-I | 0.36 |
| C-8 | do | 24.2, 10.5 | B-C | |
| C-9 | "CNB", $Sb_2O_3$ | 21.6, 10.3 | B-D | |
| C-10 | "CNB", $Sb_2O_3$ | 25.0, 10.3 | 4/6 SE-I, 2/6 B-D | |

¹ NOTE:

| Rating | Meaning |
|---|---|
| SE-0 | Extinguishes within 5 seconds, Group 0. |
| SE-I | Extinguishes within 30 seconds, Group I, does not drip. |
| SE-II | Extinguishes within 30 seconds, Group II, drips, but does not burn cotton. |
| B-C | Drippings burned cotton and sample extinguishes, both within 30 seconds. |
| B-D | Burning time exceeds 30 seconds and drips. |
| B-ND | Burning time exceeds 30 seconds and no dripping. |

In order to render ABS self-extinguishing (Group 0) 22.1 p.p.h. of ZOR and 10.3 p.p.h. of antimony oxide are required. By comparison, 30 p.p.h. of "Cloran" and 11 p.p.h. of antimony oxide are necessary to achieve a slightly inferior rating (Group I). Lowering the amount of "Cloran" results in ABS compositions which are no longer classified self-extinguishing. Similar results were achieved with "CNB" where self-extinguishing compositions were not obtained at the 25.0 p.p.h. level with 10.3 p.p.h. of antimony oxide. Thus ZOR gives self-extinguishing compositions by the UL-94 test at lower levels than materials known in the art. The notched Izod (⅛", R.T.) impact strength of these self-extinguishing compositions (i.e., C-5 and C-7) was approximately 4 times higher when ZOR rather than "Cloran" was the flame retardant additive.

EXAMPLE 9

The samples listed in Table V were prepared by compression molding techniques.

TABLE IV

| Composition: | D-1 | D-2 |
|---|---|---|
| ABS resin ¹ | 100 | 100 |
| ZOR | | 21.9 |
| "Cloran" | 29.6 | |
| $Sb_2O_3$ | 11.3 | 10.6 |
| "Chemetron 100" ² | 4.2 | 4.0 |
| Properties: | | |
| Impact notched izod R.T., ⅛" | 1.7 | 3.7 |
| Hardness, Rockwell R | 106 | 95 |
| Heat distortion (264 p.s.i. annealed) °F | 176 | 193 |
| UL-94. ¹/₁₆" vertical flame test | SE-0 | SE-I |
| Flame out time, seconds | 4 | 7 |

¹ 21.5% acrylonitrile, 21.0% butadiene, 57.5% styrene.
² Trademark for N-N ethylene-bis-stearate.

These compositions contain sufficient ZOR or "Cloran" and antimony oxide in order to achieve similar performance in the UL-94 vertical burning test. The composition (D-2) containing ZOR has more than twice the impact resistance (3.7 vs. 1.7) of the "Cloran"-containing composition (D-1) and a higher heat distortion temperature (193° F. vs. 176° F.).

EXAMPLE 10

The samples listed in Table V were prepared by compression molding techniques.

TABLE V

| Code | E-1 | E-2 | E-3 | E-4 | E-5 | E-6 | E-7 |
|---|---|---|---|---|---|---|---|
| ABS resin | 100 | 100 | 100 | 100 | 100 | 100 | 100 |
| ZOR | | 15 | | 15 | | 20 | |
| "Cloran" | | | 15 | | 15 | | 20 |
| $Sb_2O_3$ | | | | 4 | 4 | 6 | 6 |
| Impact notched izod R.T., ⅛" | 5.2 | 4.3 | 2.7 | 3.0 | 2.1 | 2.5 | 1.0 |
| Rockwell hardness, R | 95 | 91 | 98 | 89 | 98 | 90 | 87 |
| Heat distortion temperature (°F.) | 183 | 180 | 180 | 181 | 180 | 180 | 175 |

These data show that ZOR gives higher impact and heat distortion temperatures than "Cloran."

EXAMPLE 11

TABLE VI

| Code | F-1 | F-2 | F-3 | F-4 | F-5 | F-6 | F-7 | F-8 | F-9 |
|---|---|---|---|---|---|---|---|---|---|
| ABS resin | 100 | 100 | 100 | 100 | 100 | 100 | 100 | 100 | 100 |
| ZOR | | 25 | | 15 | | 20 | | 22.1 | |
| "CNB" | | | 25 | | 15 | | 20 | | 22.1 |
| $Sb_2O_3$ | | | | 4 | 4 | 6 | 6 | 10.3 | 10.3 |
| Impact notched izod R.T., ⅛" | 4.7 | 3.2 | 3.0 | 3.2 | 2.8 | 2.9 | 2.5 | 2.2 | 2.1 |
| Rockwell hardness, R | 94 | 82 | 86 | 84 | 88 | 88 | 89 | 86 | 85 |
| Heat distortion temperature (°F.) | 185 | 181 | 178 | 185 | 185 | 180 | 178 | 185 | 181 |

These results show that ZOR gives higher impact and heat distortion temperatures than "CNB."

EXAMPLE 12

TABLE VII.—EVALUATION OF ZOR IN POLYETHER URETHANE [1]

| Code | Additive | P.p.h. | D-635 burn rate (in./min.) | D-2863 oxygen index | Degree of dripping |
|---|---|---|---|---|---|
| G-1 | None | | 0.84 | 21.0 | High. |
| G-1 | ZOR | 10 | 0.83 | 22.1 | Low. |
| G-2 | ZOR | 20 | S.E. | 25.1 | None. |
| G-3 | "Cloran" | 10 | 0.68 | 22.7 | High. |
| G-4 | do | 15 | S.E. | 22.8 | Do. |
| G-5 | do | 20 | S.E. | 22.5 | Do. |

[1] "Roylar A-855" (trademark), a thermoplastic polyurethane product of Uniroyal, Inc.

The samples were prepared by milling the "Roylar" and the flame retardant ZOR or "Cloran," when used, at a temperature of 320° F. for 1 minute and then gradually cooling for the next nine minutes. Final temperatures were about 270–280° F. The results given in Table VII indicate that ZOR functions as an effective fire retardant additive for urethanes and has an added advantage over "Cloran" in that it reduces the dripping of the burning polymer.

EXAMPLE 13

TABLE VIII.—EVALUATION OF ZOR IN POLYPROPYLENE

| Code | Additive | P.p.h. | D-635 burn rate (in./min.) | D-2863 oxygen index |
|---|---|---|---|---|
| H-1 | ZOR, $Sb_2O_3$ | 15.4 | S.E. | 22.6 |
| H-2 | ZOR, $Sb_2O_3$ | 20.6 | S.E. | 21.6 |
| H-3 | ZOR, $Sb_2O_3$ | 15.6 | S.E. | 21.6 |
| H-4 | "Cloran", $Sb_2O_3$ | 15.4 | S.E. | 21. |
| H-5 | do | 15.6 | S.E. | 22.2 |

[1] "Profax 6501" (trademark), a product of Hercules, Inc., unstabilized homopolymer, nominal melt flow 4.0 ($I_2$ at 230° C.).

These results indicate that ZOR functions as a fire retardant for polypropylene although offering the advantages over "Cloran."

Having thus described my invention, what I claim and desire to protect by Letters Patent is:

1. A chemical compound having the structure 6-(1′,4′,5′,6′,7′,7′-hexahalonorborn-5′ - en - 2′-yl)-1,2,3,4,10,10-hexahalo-1,4,4a,5,6,7,8,8a-octahydro - 1,4:5,8-dimethanonaphthalene.

2. The chemical compound 6-(1′,4′,5′,6′,7′,7′-hexachloronorborn - 5′-en-2′-yl) - 1,2,3,4,10,10 - hexachloro-1,4,4a,5,6,7,8,8a-octahydro - 1,4:5,8 - dimethanonaphthalene.

3. The method of making a chemical compound having the structure 6-(1′,4′,5′,6′,7′,7′-hexahalonorborn-5′-en-2′-yl)-1,2,3,4,10,10 - hexahol - 1,4,4a,5,6,7,8,8a - octahydro-1,4:5,8-dimethanonaphthalene which comprises reacting (A) 5-vinyl-2-norbornene with (B) hexahalocyclopentadiene, and recovering said compound from the reaction mixture.

4. The method of claim 3 wherein said hexahalocyclopentadiene is hexachlorocyclopentadiene.

5. The method of claim 3 wherein the molar ratio of reactant (B) to reactant (A) in said reacting step is at least 2:1.

6. The method of claim 5 wherein said reacting step is carried out by heating the reactants at a temperature of from 110° C. to 220° C. in a liquid organic solvent for said reactants.

References Cited

UNITED STATES PATENTS

| 2,900,377 | 8/1959 | Fields | 260—139 |
| 2,952,711 | 9/1960 | Roberts | 260—649 R |

DANIEL D. HORWITZ, Primary Examiner

U.S. Cl. X.R.

260—45.7, 45.75